Aug. 12, 1952     A. J. LIPPOLD     2,606,714
VACUUM PRODUCING APPARATUS
Filed Oct. 21, 1947     5 Sheets-Sheet 1

INVENTOR.
Adolph J. Lippold
BY
Norman E. H. Peletzke
Atty.

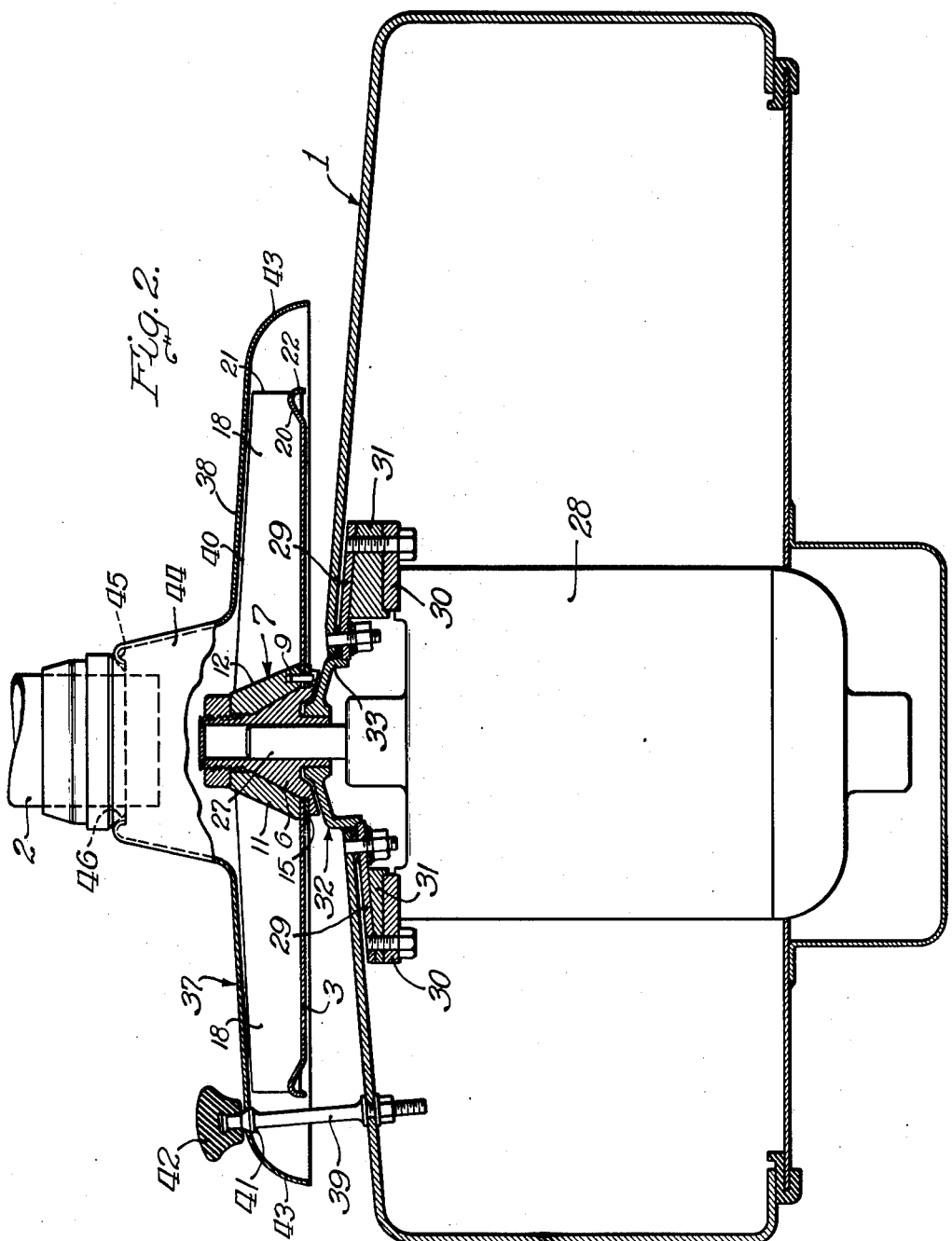

Aug. 12, 1952 — A. J. LIPPOLD — 2,606,714
VACUUM PRODUCING APPARATUS
Filed Oct. 21, 1947 — 5 Sheets-Sheet 3
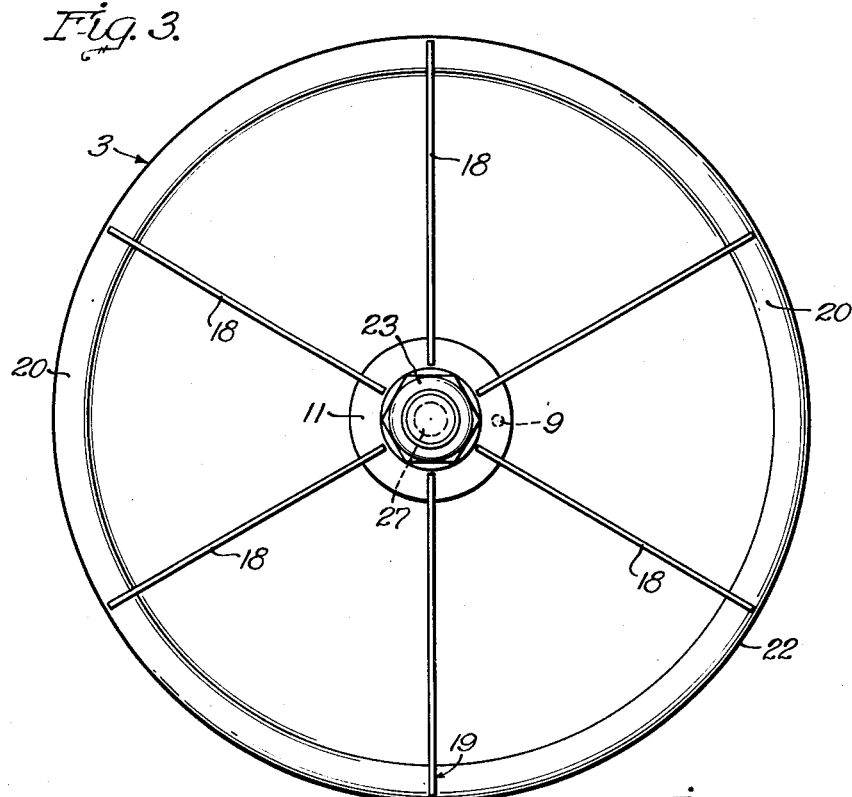
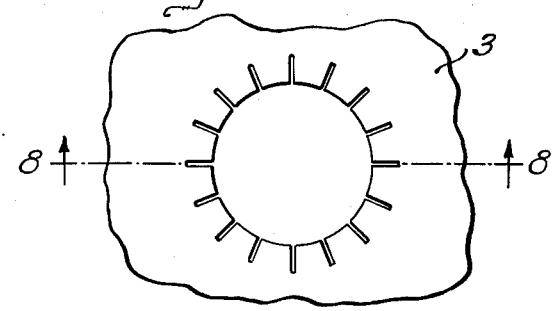
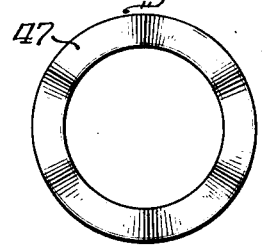
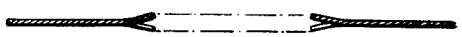
INVENTOR.
Adolph J. Lippold
BY
Norman E. H. Peletyke
Atty.

Aug. 12, 1952 — A. J. LIPPOLD — 2,606,714
VACUUM PRODUCING APPARATUS
Filed Oct. 21, 1947 — 5 Sheets-Sheet 4
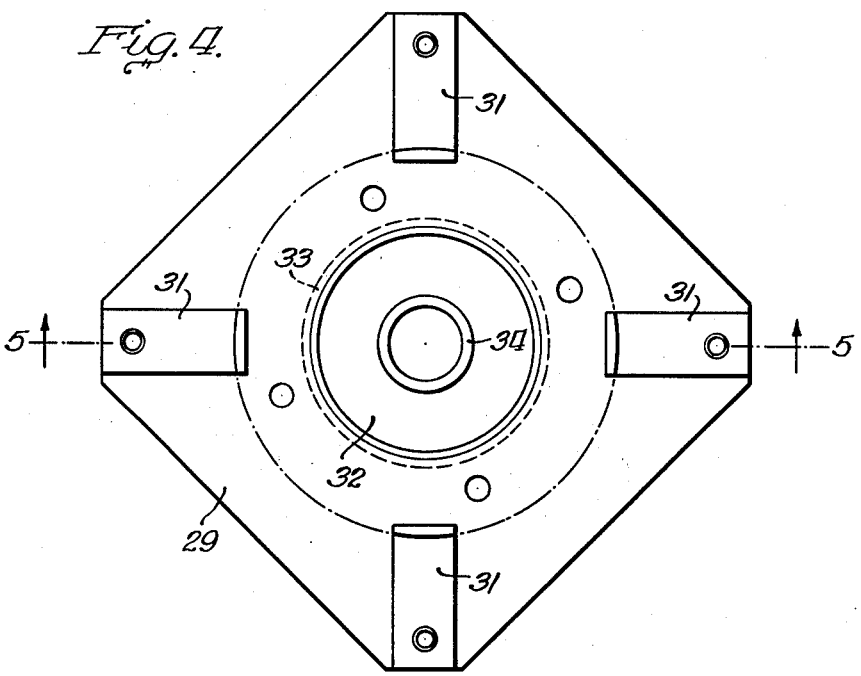
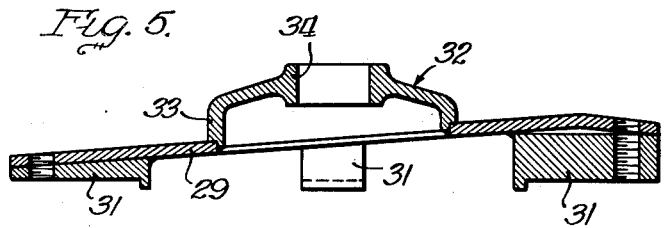
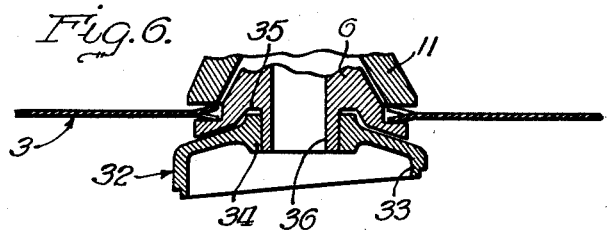
INVENTOR.
Adolph J. Lippold

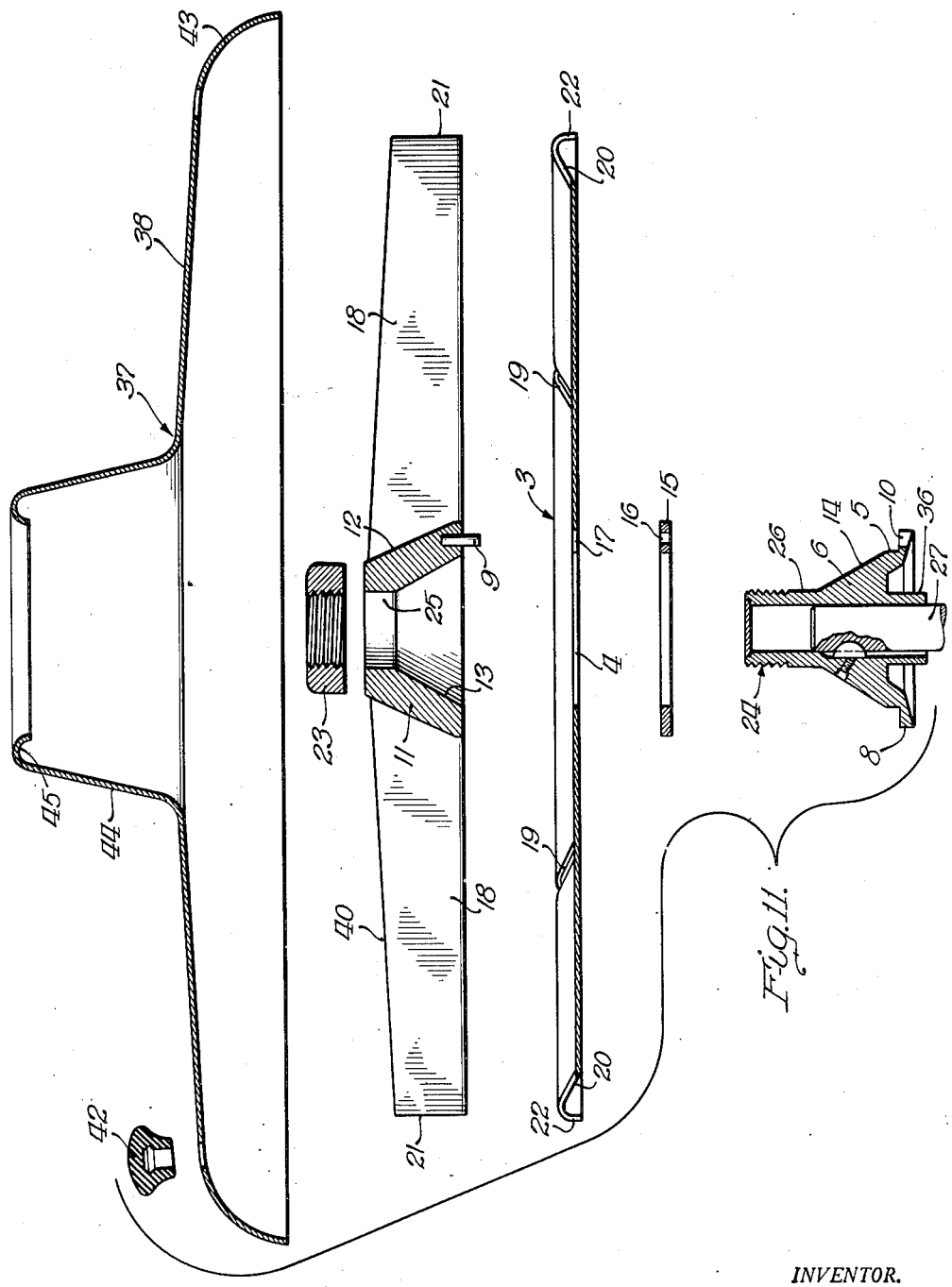

Patented Aug. 12, 1952

2,606,714

UNITED STATES PATENT OFFICE 2,606,714

VACUUM PRODUCING APPARATUS

Adolph J. Lippold, Milwaukee, Wis., assignor to Cherry-Burrell Corporation, Chicago, Ill., a corporation Application October 21, 1947, Serial No. 781,195

5 Claims. (Cl. 230—127)

This invention pertains to improvements in apparatus for producing a vacuum.

The objects of this invention include the provision of apparatus for producing a vacuum, which apparatus may be readily used in conjunction with a vacuum type bottle filler, such as milk bottle fillers, and, therefore, must be of such design that it may be easily assemblable and disassemblable, inspected and cleaned.

Conventional blowers or fans, which may also be used to produce a vacuum, as well as more conventional types of vacuum pumps, are generally of such a design that they do not lend themselves readily for use in conjunction with machinery intended primarily for the handling of foodstuffs. The machinery used for the handling of foodstuffs must, of necessity, be of a design commonly referred to as a sanitary design. Those portions of such machines which are exposed to the food product being handled, or to liquids or gases, which may come in contact with the food product being handled, must be so designed and arranged that they may be readily inspected and frequently cleaned. Ease of assembly and disassembly of such parts of such apparatus is an essential feature in the design of any apparatus intended for use in the handling of food products.

The primary object of the present invention, therefore, is to provide a highly efficient, relatively inexpensive, vacuum producing apparatus; in which the parts thereof may be readily assembled and disassembled for inspection and cleaning; in which the individual parts thereof are so designed that all surfaces thereof, when disassembled, are readily accessible for easy inspection and cleaning; in which the apparatus may be assembled into operative arrangement without the necessity of balancing or adjustment operations; and in which any worn or damaged parts may be easily and readily replaced during any cleaning or inspection operation.

The following and other objects and advantages of this invention will become more apparent and will be more readily understood when considered in connection with the illustrations of the preferred embodiment of the present invention, as contained in the drawings. The invention, however, will, without desire of limitation, be described and illustrated as an improved type of vacuum producing apparatus, adapted particularly for use in connection with a food product receptacle filling machine.

In the accompanying drawings:

Figure 2 is a sectional view, taken along line 2—2 of Figure 1 of the drawings.

Figure 3 is a plan view of the impeller of the improved vacuum producing apparatus.

Figure 4 is a plan view of a support plate for supporting the improved vacuum pump and driving motor on the parts or frame which may form part of a receptacle filling machine.

Figure 5 is a sectional view, taken along line 5—5 of Figure 4 of the drawings.

Figure 6 is a sectional, elevational view, illustrating a modified construction of the inner peripheral edge of the base plate of the improved impeller, wherein the kerfed edge is formed to produce a "lock washer" effect, whereby to lock the impeller base plate to the impeller hub.

Figure 7 is a plan view of the inner peripheral portion of the improved impeller base plate, illustrating the kerfed inner edge defining the central aperture through the base plate, as also referred to in the description of Figure 6 of the drawings.

Figure 8 is a sectional view, taken along line 8—8 of Figure 7 of the drawings.

Figure 9 is a plan view of a modified lock washer which may be substituted for the rubber-like washer illustrated in Figure 2 of the drawings intermediate the lower face of the inner peripheral edge of the improved impeller base and the adjacent face of the impeller hub.

Figure 10 is an elevational view of the modified form of lock washer illustrated in Figure 9 of the drawings.

Figure 11 is a sectional view of the major essential elements of the improved vacuum producing apparatus arranged to illustrate the relative order of assembly.

Figure 1:
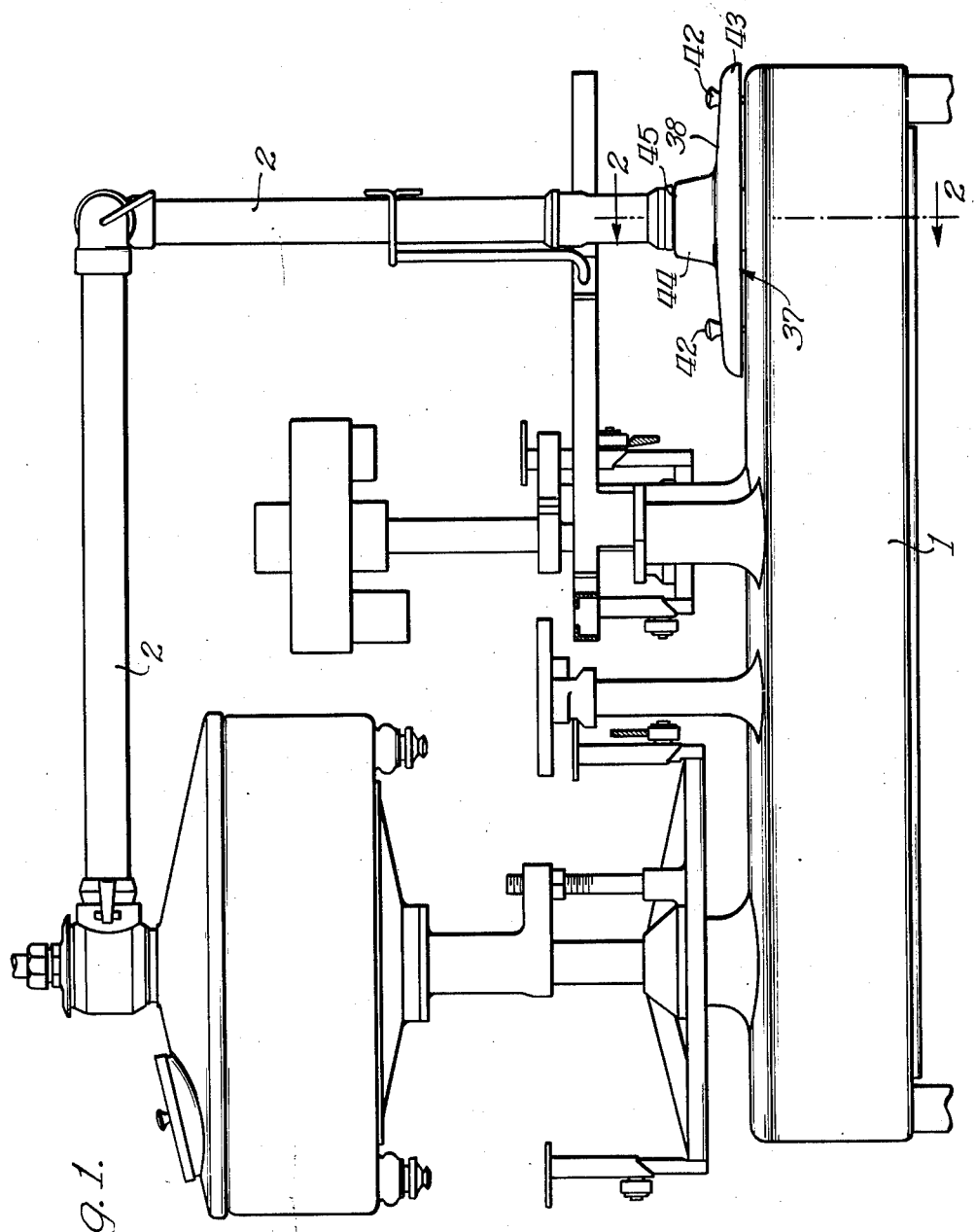
Figure 1 is a side, elevational view, illustrating the assembly of the improved vacuum producing apparatus on a vacuum type bottle filling machine.

Referring to the drawings, in which like numerals are used to identify like elements, and referring particularly to Figure 1 of the drawings, I represents the base or frame of the vacuum type of receptacle filler, upon which the improved vacuum producing apparatus is mounted for the production of a vacuum in the bowl or tank of the vacuum type filling machine through the conduit 2, which connects the bowl or tank with the inlet to the vacuum producing apparatus.

Referring particularly to Figure 2 of the drawings, the substantially planar base plate 3 of the improved vacuum pump is provided with a central aperture, which is of such a diameter as to permit a close fit, in bearing contact, of the inner peripheral edge 4 of the base plate 3 on the shoulder 5 of the inner section 6 of the sectional impeller hub 7. Base plate 3 rests upon the flange 8 at the lower and largest diameter of the substantially conical face of the inner sectional impeller hub element 6, and is locked thereto by a lock pin 9, which extends into a complementary slot 10 in the flange 8 and which lock pin 9 is fixed in the lower face of the outer sectional impeller hub element 11. The outer section of the impeller hub element 11 is provided with an outer conical face 12 and an inner conical face 13. Face 13 is complementary to the outer conical face 14 of the inner sectional hub element 6.

In the assembly of the impeller base plate 3 on the impeller hub 7, base plate 3 rests directly upon a friction washer, such as a rubber washer 15. Washer 15 is placed on the flange 10 of the inner sectional hub element 6. The washer 15 when thus assembled is provided with a perforation 16, which is aligned with the slot 10 in the flange 8 and with the slot 17 in the inner peripheral flange of the base plate 3 and the driving stud 9 in the outer hub element 11.

In the preferred arrangement of the applicant's invention, there is a driving stud 9, and similarly there is a corresponding slot 17 in the inner edge of the base plate 3, a corresponding slot 10 in the inner section 6 of the driving hub 7, and a corresponding perforation 16 in the washer 15.

In the assembly of the improved impeller, the washer 15 is assembled on the flange 8 with the perforation 16 aligned with the slot 10. The base plate 3 is then telescoped over the inner hub section 6, until it rests upon the shoulder 15, with the inner peripheral edge 4 thereof in bearing contact with the bearing face 5 of the inner hub element 6 and the slot 17 thereof in alignment with the perforation 16 in the washer 15. The outer hub element 11 is then telescoped over the inner hub element 6, with the driving stud 9 extending through the aligned slot 17, perforation 16 and slot 10.

The impeller blades or vanes 18 which are fixed to the hub 11 by any suitable means, such as by welding, or which may be formed integrally therewith, preferably extend radially therefrom toward the outer periphery of the impeller base plate 3. The lower edge of the vanes 18 may rest upon and are, at least, spaced in close proximity to the adjacent face of the impeller base 3, if not formed as a solid unit therewith. The lower portion of the outer ends of the vanes 18 extend into slots 19, provided in an upwardly directed peripheral flange 20, defining the outer periphery of the planar base plate 3. By this expedient the outer ends of the vanes 18 are stabilized against appreciable circumferential motion. The substantially vertical edges 21 of the impeller vanes 18 abut against a flange 22, which extends downwardly from the outer end of the upwardly extending flange 20 around the outer periphery of the base plate 3. The abutment of the end edges 21 of the vanes 18 with the flange 22 tend to stabilize the vanes 18 against radial motion away from the supporting hub 11 and to form a more rigid sectional impeller unit.

In the assembly of the outer, sectional hub element 11 upon the inner sectional hub element 6, it is, of course, necessary in the telescoping motion in which the hub element 11 is telescoped over the hub element 6 to extend the lower portion of the outer ends of the impeller vanes 18 into the slots 19. Having thus assembled the elements of the impeller with the driving studs 9 extending through the aligned slots and perforations 17, 16 and 10 and the portions of the ends of the impeller vanes 18 extending into the slots 19, the assembly is locked in operative position by tightening the lock nut 23 against the upper face of the outer hub element 11. Nut 23 is threaded to the upper cylindrical extension 24 of the inner conical hub element 6. The tightening of the lock nut 23 is preferably continued until the complementary conical faces 13 and 14 of the outer and inner hub elements 11 and 6, respectively, are forced into engagement. The hub elements 6 and 11 are accurately aligned, when in operative position, by the engagement of the complementary conical faces 13 and 14 and by the bearing engagement between the cylindrical face 25 defining the aperture through the outer hub element 11 and the complementary cylindrical face 26, defining the outer surface of the lower portion of the cylindrical extension 24 of the inner hub element 6, as illustrated in Figure 11 of the drawings.

The inner hub element 6 is mounted upon a suitable drive shaft, such as the shaft 27, of the driving motor 28. In the preferred embodiment of applicant's invention, as illustrated in Figure 2 of the drawings, the drive shaft 27 extends through an aperture or opening in the supporting frame 1, in which supporting frame the motor 28 is housed.

The driving motor 28 is supported upon the base or frame 1 by means of a motor support 29, as illustrated in Figure 5 of the drawings. Support plate 29 is centrally apertured and is fixed to the frame 1 with the aperture thereof in alignment with the opening or aperture in the frame 1, through which the drive shaft 27 extends. The support plate 29 may be fixed to the frame 1 in any suitable manner, such as by welding, or by the use of other attaching elements, such as bolts and the like.

The motor 28 is secured to the base plate 29 in a suitable conventional manner, such as by the use of bolts extending through the face plate 30 of the motor 28 into the support plate 29. A modified form or manner of supporting the driving motor 28 upon the frame 1 is illustrated in Figure 5 of the drawings, in which spacing wedges 31 are positioned between the irregular configuration of the adjacent surface of the support frame 1 and the face plate 30 of the motor 28.

To seal the aperture through the support plate 29 and the frame 1, through which the drive shaft 27 extends, there is provided an apertured closure or seal 32, which is provided with a downwardly extending, outer peripheral flange 33, secured by any suitable manner, such as by soldering or welding, to the adjacent faces of the apertures through the support plate 29 in frame 1. The closure or seal 32 is provided with a centrally located aperture, defined by a flange 34, the upper edge of which flange extends into an undercut recess 35 in the lower face of the inner sectional hub element 6. The inner face of the flange 34 is in bearing contact with or closely spaced from a downwardly extending cylindrical shank 36 on the lower face of the sectional hub element 6. By this arrangement of the shank 36, the flange 34 and the undercut groove 35 which are in the lower face of the inner hub element 6 and on the seal element 32, the applicant has provided an impeller and motor mounting, wherein the opening through the supporting frame, through which the drive shaft 27 extends, is sealed against the passage of moisture or condensate or foreign matter.

The casing or housing for the improved impeller or vacuum producing apparatus is formed of the rotatable impeller base plate 3, and the apertured cover plate 37. The body portion 38 of the cover 37 consists of a substantially planar, outwardly extending, ported plate. The cover 37 is mounted upon the frame 1 by a plurality of support studs 39, whereby the cover plate 37 is so supported that the inner lower face of the planar portion 38 of the cover plate 37 is closely spaced from the upper edges 40 of the impeller vanes 18. The accurate, relative, close spacing of the upper surfaces of the vanes 18 of the impeller and the lower surface of the impeller cover 37 results from the manner in which the impeller vanes 18 are supported in fixed position axially on the driving motor 28, which, in turn, is fixedly secured to the frame 1 and the relatively fixed position in which the cover 37 is supported on the support studs 39, also fixed to the support frame 1.

Applicant's invention contemplates the use of at least three support studs 39, each of which is fixed in any desired manner to the frame 1, with the upper end thereof extending through suitable apertures in the peripheral portion of the cover plate 37. Each of the support studs 39 is provided with a shoulder 41, which abuts against the adjacent inner face of the cover plate 37. The cover plate 37 is secured to the studs 39 by means of the nuts 42, which are threaded to the upper end of the studs 39, to thereby securely support the impeller cover plate 37 in locked position with respect to the supporting frame 1.

The cover 37, which, together with the base plate 3, constitutes the casing for the multiple vane impeller of the improved vacuum producing apparatus, is provided along its outer periphery with an outwardly and downwardly extending flange 43, which overlaps the outer end of the vanes 18, and the outer periphery of the base plate 3. The lowermost edge of the flange 43 is spaced from the outer periphery of the base plate 3 by a distance somewhat in excess of the space between the upper portion of the flange 20 on the base plate 3 and the adjacent surface of the body portion 38 of the cover plate 37. The particular spacing of the upwardly turned flange at the outer periphery of the base plate 3, with respect to the adjacent surface of the body portion 38 of the cover 37 produces a Venturi effect in the air flow passage formed between the base plate 3 and the cover 37 and any two adjacent vanes 18.

The central aperture in the cover plate 37 is defined by an upwardly and inwardly extending flange 44, as illustrated particularly in Figure 11 of the drawings. Flange 44 is formed integrally with the body portion 38 of the cover plate 37, and is provided at its upper edge with an inwardly and downwardly curved flange 45. The flange 45 is of a rounded, uniform configuration, so as to adapt it to be easily fitted to the end of the supply conduit 2. The end of supply conduit 2 is provided with a downwardly and inwardly beveled ferrule 46 adapted to be fitted snugly into the mouth of the inlet into the cover 37, formed by the inwardly and downwardly rounded flange 45.

The inner hub element 6 of the impeller of applicant's improved vacuum producing apparatus may be mounted on the drive shaft 27 in any conventional manner, such, for example, as by the use of suitable key and keyway and a locking screw secured to retain the key and keyway in proper interconnecting position.

In the hereinbefore described embodiment of applicant's invention, it has been pointed out that the centrally apertured impeller base 3 is fitted over the inner sectional element 6 of the sectional driving hub, and that a friction washer 15, which may be formed of rubber, is mounted upon the inner hub element 6 to support the impeller base plate 3.

In Figures 6 and 7, there is illustrated a modification in which the edge defining the central aperture through the base plate 3 is kerfed as shown in Figure 7 of the drawings, and the alternate segments thus formed are bent upwardly and downwardly, respectively, whereby to produce a lock washer effect on the periphery of the base plate 3, defining the central aperture therethrough.

By this expedient, it is possible to eliminate the use of the rubber washer 15 and rely upon the gripping effect of the alternately bent segments of the inner periphery of the base plate 3, to securely grip the adjacent faces of the sectional drive hub elements 6 and 11.

In the variation of the impeller base plate design, illustrated in Figures 7 and 8 of the drawings, it is not necessary to use the drive studs 9. Although not illustrated in the drawings, it is apparent that slots 17 to receive the studs 9 could readily be provided in the variation of the base plate 3, illustrated in Figures 7 and 8 of the drawings.

In Figures 9 and 10 of the drawings, there is illustrated a variation of a washer 47, which may be substituted for the washer 15 in the assembly of the improved type of impeller for the applicant's vacuum producing machine. The washer 47 may be formed of resilient, spring-like material, such as steel, and is provided with a wavy configuration transversely of the plane of the washer. The washer 47 may be substituted for the washer 15 but in the use of the washer 47 it is not necessary to also use the drive studs 9. Obviously, the washer 47 may, if desired, be provided with perforations 16, so as to enable the joint use of the driving studs 9 and the washer 47.

From the foregoing description, it is apparent that the applicant has provided an improved type of vacuum producing machine, which may be readily disassembled and assembled, and which lends itself particularly well to easy inspection and cleaning. It also follows, of necessity, that apparatus, such as contemplated by the applicant's invention, also lends itself readily to the easy replacement of worn or damaged parts.

Having thus described and illustrated the preferred embodiment of the present invention in an improved apparatus for producing a vacuum, the invention is not to be restricted to the specific embodiment thereof, as illustrated in the drawings and as hereinbefore described, excepting insofar as may be necessary in view of the disclosure of the prior art, and the appended claims.

The invention is hereby claimed as follows:

1. A vacuum producing apparatus, comprising, in combination, an impelling wheel having a driving hub and a base plate and having outwardly extending vanes secured to the driving hub of said wheel, a cover plate having a port aligned with said hub and overlying the adjacent surfaces of said vanes in close proximity thereto and forming with said base plate a casing for said impelling apparatus, a rotatable support means for said impelling wheel mounted on a frame, a fixed support means for said cover plate mounted on said frame, said base plate being releasably secured to said hub and said hub being formed of mating elements adapted to releasably secure said base plate, a compression washer intermediate opposed faces of the mating elements of said driving hub, and driving stud means fixed to one of said hub elements and extending through said base plate into the other of said mating hub elements.

2. A vacuum producing apparatus, comprising, in combination, an impelling wheel having a driving hub and a base plate and having outwardly extending vanes secured to the driving hub of said wheel, a cover plate having a port aligned with said hub and overlying the adjacent surfaces of said vanes in close proximity thereto and forming with said base plate a casing for said impelling apparatus, a rotatable support means for said impelling wheel mounted on a frame, a fixed support means for said cover plate mounted on said frame, said base plate being releasably secured to said hub and said hub being formed of mating elements adapted to releasably secure said base plate, a compression washer intermediate opposed faces of the mating elements of said driving hub, and compressible friction means intermediate the impeller base and an adjacent face of said driving hub.

3. An impelling apparatus, comprising, in combination, an impeller wheel having a driving hub and a base plate and having outwardly extending vanes secured to the driving hub of said wheel and extending outwardly therefrom in close proximity to and in engagement with said base plate throughout the entire length of said vanes, a cover plate having a port aligned with said hub and overlying the adjacent surfaces of said vanes in closed proximity thereto and forming with said base plate a casing for said impelling apparatus, rotatable support means for said impelling wheel mounted on a frame, and fixed support means for said cover plate mounted on said frame, said base plate being releasably secured to said hub and said hub being formed of mating sectional elements adapted to releasably secure said base plate, said driving hub being formed of sections having opposed faces and said base plate being provided with a central aperture defined by a bearing face snugly telescoped over a complementary bearing portion on said driving hub with the edge of said base plate adjacent said aperture clamped between said opposed faces, and a compression washer intermediate one of said opposed faces and an adjacent face of said base plate.

4. An impelling apparatus, comprising, in combination, an impeller wheel having a driving hub and a base plate and having outwardly extending vanes secured to the driving hub of said wheel and extending outwardly therefrom in close proximity to and in engagement with said base plate throughout the entire length of said vanes, a cover plate having a port aligned with said hub and overlying the adjacent surfaces of said vanes in close proximity thereto and forming with said base plate a casing for said impelling apparatus, rotatable support means for said impelling wheel mounted on a frame, and fixed support means for said cover plate mounted on said frame, said base plate being releasably secured to said hub and said hub being formed of mating sectional elements adapted to releasably secure said base plate, said driving hub being formed of sections having opposed faces and said base plate being provided with a central aperture defined by a bearing face snugly telescoped over a complementary bearing portion on said driving hub with the edge of said base plate adjacent said aperture clamped between said opposed faces, and a compression washer intermediate one of said opposed faces and an adjacent face of said base plate, the edge of said base plate clamped between said opposed faces being slotted with the alternate portions of said edge intermediate said slots bent at opposite angles to the plane of the face of said base plate.

5. An impelling apparatus, comprising, in combination, an impeller wheel having a driving hub and a base plate and having outwardly extending vanes secured to the driving hub of said wheel and extending outwardly therefrom in close proximity to and in engagement with said base plate throughout the entire length of said vanes, a cover plate having a port aligned with said hub and overlying the adjacent surfaces of said vanes in close proximity thereto and forming with said base plate a casing for said impelling apparatus, rotatable support means for said impelling wheel mounted on a frame, and fixed support means for said cover plate mounted on said frame, said base plate being provided with an outer peripheral flange having a peripheral portion projecting from the substantially planar face of said base plate, the flange on said base plate being provided with transverse slots to receive a portion of the outer end of an associated vane whereby to limit the possible circumferential and radial motion of said vanes.

ADOLPH J. LIPPOLD.

REFERENCES CITED

The following references are of record in the file of this patent:

UNITED STATES PATENTS

| Number | Name | Date |
|---|---|---|
| 293,286 | Tunelius | Feb. 12, 1884 |
| 1,057,959 | Hearn | Apr. 1, 1913 |
| 1,471,559 | Knauf | Oct. 23, 1923 |
| 2,245,989 | Leathers | June 17, 1941 |
| 2,350,739 | Ferre | June 6, 1944 |
| 2,370,202 | Stewart | Feb. 27, 1945 |
| 2,394,953 | Waterfill | Feb. 12, 1946 |

FOREIGN PATENTS

| Number | Country | Date |
|---|---|---|
| 309,096 | Germany | Nov. 11, 1918 |
| 347,043 | Great Britain | Apr. 23, 1931 |